United States Patent [19]

Levine

[11] 4,079,351

[45] Mar. 14, 1978

[54] PRESSURE RESPONSIVE SENDER

[75] Inventor: Mark Levine, Plainview, N.Y.

[73] Assignee: General Automotive Speciality Co., Inc., Carlstadt, N.J.

[21] Appl. No.: 699,446

[22] Filed: Jun. 24, 1976

[51] Int. Cl.² ............................................. H01L 10/10
[52] U.S. Cl. ........................................ 338/36; 73/723; 338/42
[58] Field of Search ............... 338/36, 42; 73/398 AR

[56] References Cited

U.S. PATENT DOCUMENTS

| | | | |
|---|---|---|---|
| 2,286,717 | 6/1942 | Clason | 338/42 |
| 2,502,559 | 4/1950 | Coxon | 338/42 |
| 2,846,549 | 8/1958 | Boddy | 338/42 |
| 2,867,769 | 1/1959 | Hunt et al. | 338/42 X |
| 3,445,801 | 5/1969 | Sattler | 73/398 AR X |

*Primary Examiner*—C. L. Albritton
*Attorney, Agent, or Firm*—Darby & Darby

[57] ABSTRACT

A pressure responsive sender whose electrical resistance varies in response to variations in sensed pressure, adapted to be inserted in series with a voltage source and a pressure indicating gauge, such as an oil pressure indicating gauge. The sender includes a pressure sensing diaphragm coupled to a contact assembly which electrically engages a variable resistor assembly to an extent which is a function of the sensed pressure so that a predetermined electrical resistance for a particular sensed pressure is obtained. A dual stage spring system is associated with the pressure sensing assembly providing increased sensitivity in a low pressure range, a well-defined cut-off pressure and accurate calibration of the sender. The resistor and contact assemblies are pivotally mounted in a manner such that hysteresis problems, i.e., obtaining slightly different resistance values for identical pressures after cycling, are eliminated. The pivotal mounting of the elements also assures substantially identical sensitivity for devices produced in quantity.

21 Claims, 6 Drawing Figures

PRESSURE RESPONSIVE SENDER

BACKGROUND OF THE INVENTION

This invention relates, in general, to pressure transducers and, more particularly, to pressure senders for providing a predetermined electrical resistance in response to a particular sensed pressure.

Many applications require that fluid pressure in a system be monitored. For example, it is often desired to provide in automobiles gauges which quantitatively indicate oil pressure in lieu of the usual indicator light which merely indicates a "zero-pressure" condition.

Generally, such pressure gauges are electrically connected in series to what are generally termed pressure senders. Essentially, such a pressure sender includes a variable resistor assembly (in the gauge circuit) and pressure sensing apparatus adapted to be tapped into the line in which the fluid whose pressure is to be measured is carried. The resistance presented by the sender in the gauge circuit is a function of the sensed pressure. Since a variation in the pressure in the line will cause a responsive variation in the resistance of the sender, the reading of the gauge, which is serially connected to the sender, will reflect the fluid pressure sensed.

Most presently existing pressure senders generally include a fixed resistor element, which may comprise a wound coil, a pressure sensing diaphragm which fluidly communicates with the pressure line and a contact which is moved into electrical engagement with the resistor to an extent determined by the sensed pressure so that a pressure resistance is obtained from the coil for a particular sensed pressure. The coil and contact are serially connected to the gauge circuit and, therefore, a variation in resistance of the coil will cause a variation in the gauge reading. However, these existing pressure senders are not entirely satisfactory for a variety of reasons. Often, the sensitivity of such senders is insufficient to provide a well-defined "cut-off" pressure, i.e., a minimum pressure below which, a zero reading (open circuit) on the gauge will result. Closely associated with this problem is that currently available pressure senders are often difficult to precisely calibrate due to the senders' relative insensitivity at the relatively low pressures used during calibration.

Another problem inherent in prior art pressure senders is that of hysteresis. More particularly, it has been found that identical pressures in the pressure line will not produce identical resistances in the sender (and, thus, will not result in identical readings by the gauge) after repeated cycling of the pressures. This has been found to be due to the fact that the contact, under the sender being subject to a pressure previously sensed, does not move into the same position (to produce the same resistance as it did originally, due to the relatively low restoring forces available.

Yet another serious problem is in obtaining pressure senders in quantity production which have substantially identical sensitivity during operation. These problems have generally resulted from the manufacturing tolerances inherent in large-scale manufacturing operations.

SUMMARY OF THE INVENTION

Accordingly, one object of this invention is to provide a new and improved pressure sender which presents a predetermined electrical resistance in an electrical circuit in response to a particular sensed pressure.

Another object of the invention is the provision of a new and improved pressure sender which has a well-defined cut-off pressure whereby a zero gauge reading (open circuit) is positively obtained when the line pressure falls below a predetermined minimum.

Still another object of the present invention is to provide a new and improved pressure sender which can be more accurately calibrated than those currently available.

A further object of the instant invention is to provide a new and improved pressure sender not subject to hysteresis currently encountered in existing devices.

A still further object of this invention is the provision of a new and improved pressure sender which may be manufactured in quantity production and wherein the sensitivity of the senders so manufactured will be substantially the same.

Briefly, in accordance with one embodiment of this invention, these and other objects are obtained by providing a pressure sender including a movable contact coupled to a pressure sensing assembly and a variable resistor element which is electrically engaged by the contact in a manner so as to provide a predetermined resistance for a particular pressure sensed by the pressure sensing assembly. The resistor element is movably mounted in a pivotal manner so as to allow for accurate calibration of the sender without regard to the pressure being sensed. Further, the contact is movably mounted in a pivotal manner, the pivotal axis of the resistor element and contact being at least very close to each other, thereby resulting in the hysteresis and volume production problems discussed above being alleviated. Further, a dual spring system is provided so that the sensitivity of the sender of the present invention is greater in a lower pressure range than it is during normal operation. This dual spring system results in a well defined cut-off pressure and allows for more accurate calibration than has been achieved with presently available pressure senders.

DESCRIPTION OF THE DRAWINGS

A more complete appreciation of the invention and many of the attendant advantages thereof will be readily appreciated as the same becomes better understood by reference to the following detailed description when considered in connection with the accompanying drawings in which.

DESCRIPTION OF THE PREFERRED EMBODIMENT

Figure 1:
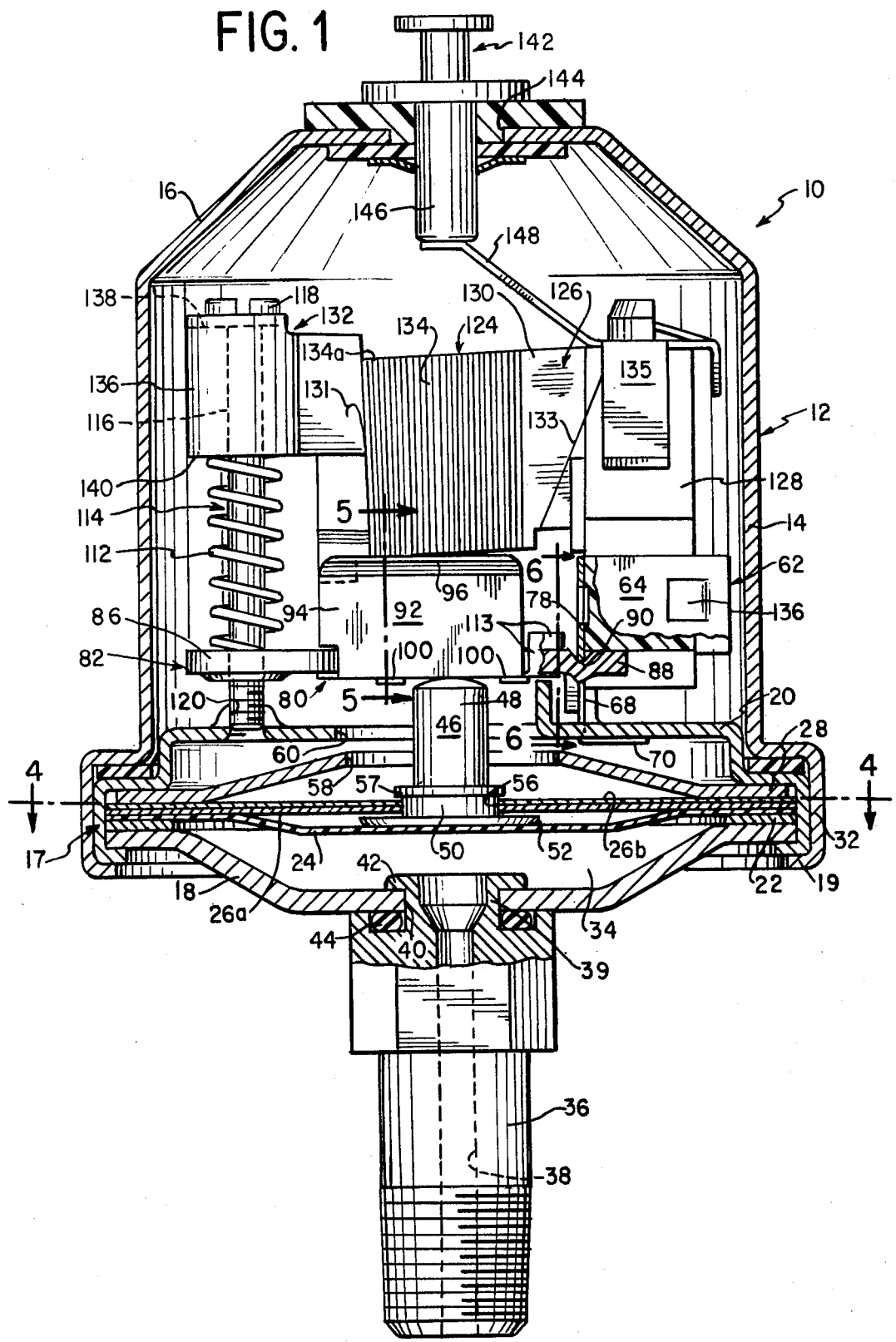
FIG. 1 is a front view in section of the pressure sender according to the present invention shown in operation at the cut-off pressure.
Figure 2:
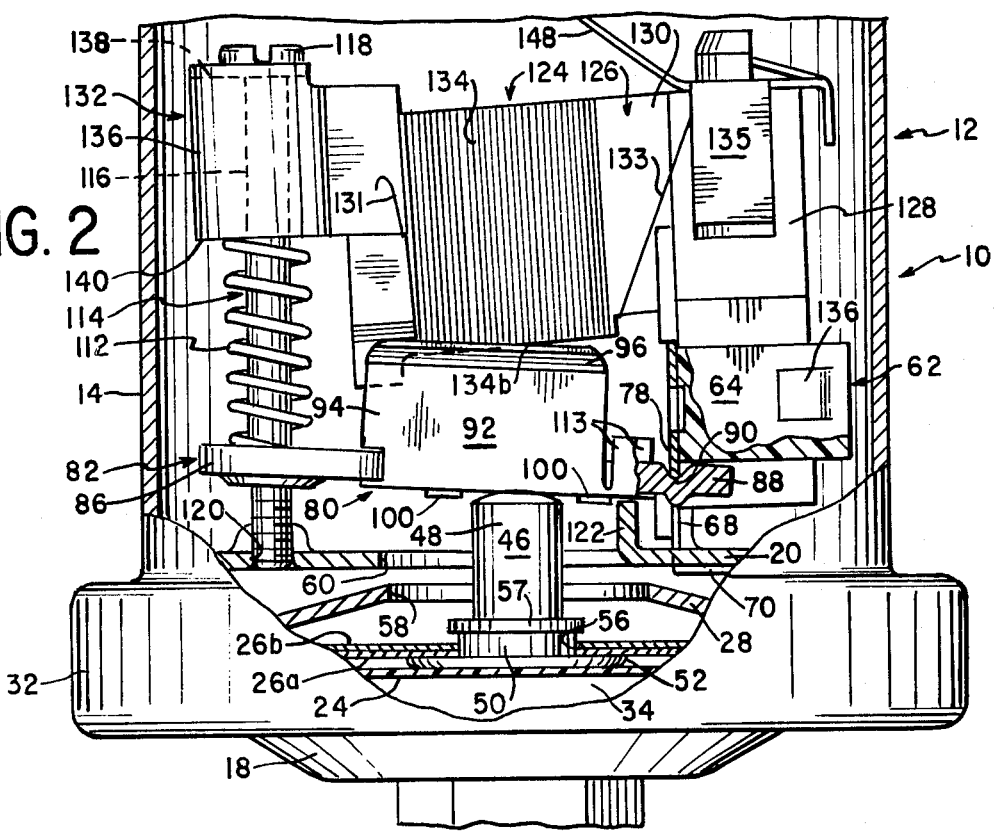
FIG. 2 is a front view in partial section of a portion of the pressure sender according to the present invention shown in operation at the transition pressure between a lower, high sensitivity, pressure range and an upper pressure range.
Figure 3:
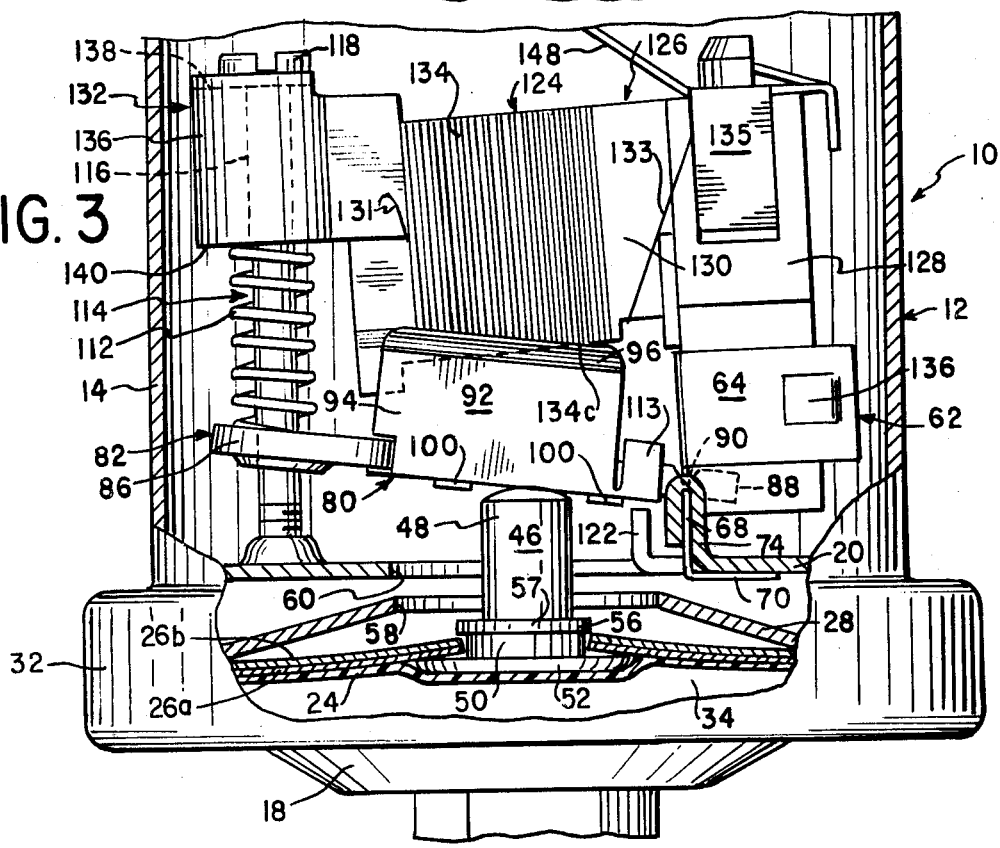
FIG. 3 is a front view in partial section of a portion of the pressure sender according to the present invention shown in operation at a pressure in the upper range.
Figure 4:
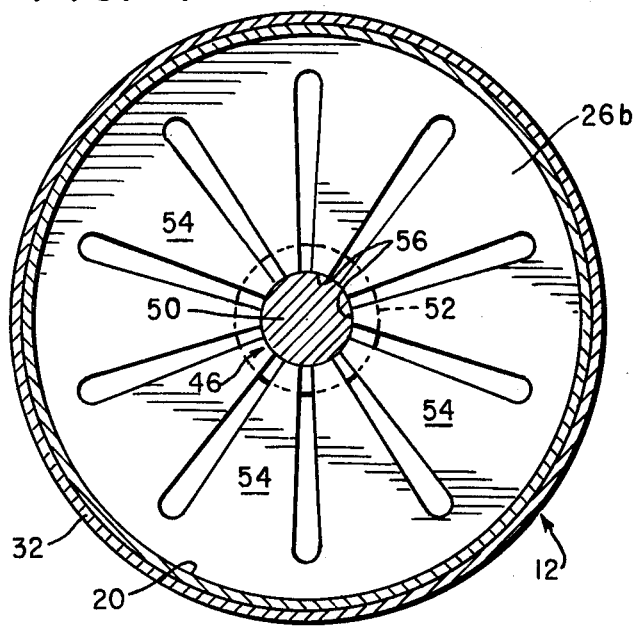
FIG. 4 is a section view taken along line 4—4 of FIG. 1.

Referring now to the drawings wherein like reference characters designate identical or corresponding parts throughout the several views, FIGS. 1–3 illustrate the pressure sender, generally denoted as 10, at various stages of operation. A housing 12 including a generally cylindrical center wall 14 and an inwardly tapering upper wall 16 is disposed over the sender pressure chamber assembly 17 on which the components of the sender, described in detail hereinbelow, are mounted. The pressure chamber assembly generally includes, among other elements described hereinbelow, an outer mounting wall 20, an inner partition 28, a pair of contiguous spring members 26a and b, a diaphragm 24, a bottom wall 18, and a gasket 22 sealingly engaged between the peripheral edges of bottom wall 18 and diaphragm 24. The peripheral edge portion of mounting wall 20 is crimped as at 19 over the corresponding edges of spring members 26a, b, diaphragm 24 and bottom wall 18 to secure these elements in the configuration shown. A circumferentially extending lip 32 is formed at the lower end of central wall 14 of housing 12, which lip is itself crimped over the crimped peripheral edge 19 of mounting wall 20 securing the housing to the pressure chamber assembly.

Bottom wall 18 and diaphragm 24, which may be formed of any elastomeric material suitable for its environment, define a fluid-tight chamber 34. The interior of chamber 34 is adapted to fluidly communicate with the interior of the pressure line via a threaded fitting 36 having an axially extending bore 38 formed therethrough opening into chamber 34. A reduced diameter upper end 39 of fitting 36 (FIG. 1) passes through an opening 40 formed in bottom wall 18 and is secured in fluid-tight relationship thereto by crimping a collar 42 over the interior surface of bottom wall 18 so that an O-ring 44 seals the connection.

A push member 46 is disposed within pressure chamber assembly 17 and is defined by an upper rod portion 48, a central enlarged diameter portion 50 and a lower, planar shoulder 52 whose bottom surface rests on the central area of diaphragm 24. The rod portion 48 extends through openings 58 and 60 formed in inner partition 28 and mounting wall 20, respectively, while the enlarged diameter portion 50 of push member 46 extends through a central opening 56 formed in springs 26a and b.

Referring to FIGS. 1–4, a pair of substantially identical, relatively flat cantilever springs 26a, b, extend over diaphragm 24 in opposed relationship thereto, their peripheral edges being held by the crimping action of edge 19 of mounting wall 20 as described above. Each spring 26 is preferably formed of spring steel blanked from sheet metal to define a plurality of radially extending cantilever elements 54 (FIG. 4) and the central opening 56 through which the enlarged diameter portion 50 of push member 46 passes.

Referring to FIG. 1, which illustrates the pressure sender in operative communication with a pressure line having a pressure equal to the desired, predetermined cut-off pressure, it is noted that the upper surface of shoulder 52 of push member 46 is spaced from and does not engage the lower spring 26a. It is understood that at zero sensed pressure, the diaphragm is in a position somewhat below that shown in FIG. 1, shoulder 52 being spaced an even greater distance from lower spring 26a. A lip 57 is provided at the upper end of enlarged diameter portion 50 of push member 46 to provide a limit stop for the downward movement of push member 46.

Inner partition 28 essentially provides a protective function for spring members 26a, b and has an enlarged central opening 58 through which the body portion 48 of push member 46 extends as mentioned hereinabove.

The mounting wall 20 essentially provides the top wall of the pressure chamber assembly 17 and has a central opening 60 formed therein, again for the purpose of permitting passage therethrough of the body portion 48 of push member 46. The remaining elements of the pressure sender 10 are mounted on mounting wall 20 as described hereinbelow.

Figure 6:
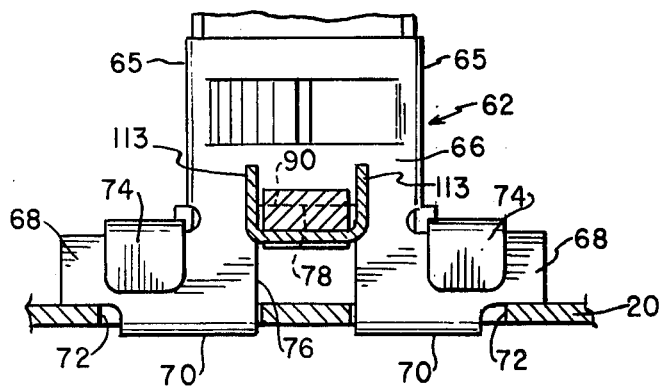
FIG. 6 is a section view taken along line 6—6 of FIG. 1.

Referring to FIGS. 1–3 and 6, a mounting clip 62 formed of an electrically conductive material is secured to mounting wall 20 adjacent central opening 60. Mounting clip 62 includes a pair of resilient, opposed side portions 64 outwardly extending towards the periphery of wall 20 which are formed by bending a body portion 66 of clip 62 along fold lines 65 (FIG. 6). Body portion 66 has a pair of ears (FIG. 6) formed at its lower end and a corresponding pair of outwardly extending tabs 70 which engage the lower surface of mounting wall 20, extending through slots 72 (FIG. 6) formed therein. A pair of U-shaped tabs (FIGS. 3 and 6) 74 are struck from mounting wall 20 and extend over the upper edges of ears 68 to retain mounting clip 62 in place. A cutout 76 (FIG. 6) is provided in body portion 66 having side edges partially defining ears 68 and an upper, knife edge 78.

Figure 5:
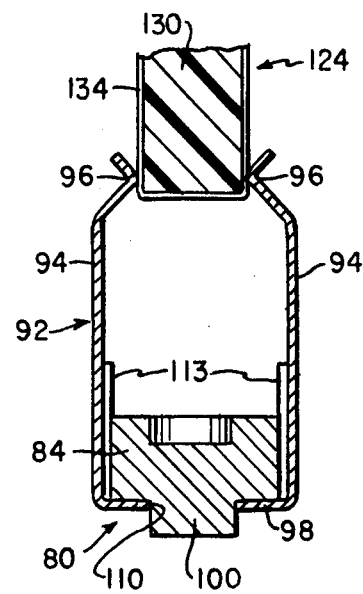
FIG. 5 is a section view taken along line 5—5 of FIG. 1.

Pivotally mounted about the knife edge 78 of cutout 76 in a manner described in detail hereinbelow is a contact assembly, generally denoted as 80. Contact assembly 80 includes an elongate, electrically conductive contact member support platform 82 defined by a central portion 84 (FIG. 5), an enlarged seating portion 86 and a pivot portion 88 having a V-shaped groove 90 formed therein. An elongate, electrically conductive contact member 92 having a U-shaped cross-section (FIG. 5) is secured over central portion 84 of support platform 82 as best seen in FIG. 5. Contact member 92 includes a pair of contact legs 94 having inwardly crimped contact portions 96 at their upper end for electrically engaging a resistance element as set forth in detail hereinbelow. An integral bridging portion 98 connects contact legs 94 at their lower ends. A pair of protuberances 100 formed on the lower surface of platform central portion 84 extend through openings 110 (FIG. 5) in the contact member bridging portion 98 to accurately position the contact member on platform 82 and to prevent axial shifting thereof. A pair of upwardly directed tabs 112 (FIG. 6) may be provided on contact member 92 to further aid in positioning the contact member and securing it to support platform 82. The contact member is electrically grounded through the support platform 82, clip 62, outer mounting wall 20, etc.

As mentioned hereinabove, the contact assembly 80 is pivotally mounted about an axis defined by knife edge 78 of clip 62. The enlarged seating portion 86 of support platform 82 is urged in a downward direction, as seen in FIG. 1, by engagement with the lower end of a helical spring 112, which is mounted on the shank 116 of a screw 114 having a slotted head 118, the lower end of shank 116 passing through an opening formed in platform seating portion 86 and threadedly engaging an opening 120 formed in mounting wall 20. The upper end of spring 112 engages a bushing portion 132 of a resistor assembly 124 which is normally fixed during the operation of the pressure sender. By virtue of the downwardly directed force applied by spring 112 to platform seating portion 86, the bridging portion 98 of contact member 92 is urged downwardly against the upper edge of body portion 48 of push member 46 thereby urging the pivot portion 88 of platform 82 against knife edge 78 so that groove 90 receives the knife edge. When the sender is not connected to a pressure line, push member 46 is urged downwardly until the limit stop 56 engages the upper surface of spring 26b. An upwardly extending lip 122 may be formed in mounting wall 20 directly underneath platform 82 to provide a safety limit stop to prevent inadvertent downward movement of the contact assembly, which might occur, for example, during assembly, which might cause permanent deformation of springs 26. Thus, it can be seen that any upward movement of push member 46 due to an increased pressure acting on diaphragm 24, (described in detail in operation of the device hereinbelow) causes the contact assembly 80 to pivot about knife edge 78 against the force of helical spring 112.

Still referring to FIGS. 1-3, a variable resistor assembly, generally denoted as 124, is pivotally mounted about an axis of rotation which substantially coincides with knife edge 78 provided on mounting clip 62 and about which contact assembly 80 pivots. Resistor assembly 124 includes a generally L-shaped body member 126 preferably formed of a phenolic material, defined by a post portion 128, a resistor portion 130 integrally formed with and extending at right angles to the upper end of post portion 128 and a bushing portion 132 which integrally extends from the free end of resistor portion 130. A coil 134 is wound around resistor portion 130 formed of resistance wire having one end 131 electrically insulated by securing the same to the resistor portion mechanically or by lacquer and the other end 133 being connected to a contact 135 having an upwardly extending contact finger 148. Coil 134 is located directly above the space defined between contact legs 94 as best seen in FIG. 5.

The post portion 128 of the body member 126 is captured at its lower end between the side portions 64 of mounting clip 62, the sides of post portion 128 being undercut so as to snap into position between the clip side portions and be retained therein by inwardly extending tabs 136.

Bushing portion 132 is defined by a pair of opposed walls 136 (only one of which is shown) defining a passage between them through which the upper portion of screw shank 116 extends. The head 118 of screw 114 bears against a shoulder 138 formed on the inner surfaces of sleeve walls 136. The upper end of helical spring 112 bears against a similarly formed shoulder 140 formed at the lower end of bushing walls 136.

It can now be seen that the variable resistor assembly 124 is mounted solely on mounting clip 62. The variable resistor assembly by virtue of the above-described design of clip 62, including the cut-out 76, will pivot or flex about an axis substantially colinear with knife edge 78 when a force is applied thereto in the absence of a restraining force. Thus, if screw 114 is rotated so as to travel into or towards mounting wall 20, the resistor assembly will pivot in a counterclockwise manner about a line coincident with knife edge 78 due to the engagement of screw head 118 with shoulder 138 while if the screw is rotated in the opposite direction, the resistor assembly will pivot clockwise under the action of spring 112. During operation of the sender, screw 114 is fixed and, therefore, any movement of resistor assembly 124 is prevented.

An electrical terminal post 142 extends through a suitably insulated opening 144 centrally formed in inwardly tapering wall 16 of housing 12. The lower end 146 of terminal post 142 electrically engages the free end of contact finger 148 which is electrically connected to coil 134 as mentioned hereinabove.

In operation of the device, the pressure sender is inserted into the pressure line by threadably engaging fitting 36 into a mating fitting previously provided in the pressure line. The fluid-tight chamber 34 is thus exposed to the pressure to be sensed and, assuming that it is above ambient, the pressure moves diaphram 24 upwardly as shown in FIG. 1. Push member 46 is moved upwardly with diaphragm 24 so that the upper surface of rod portion 48 urges U-shaped contact member 92 into pivotal movement in a clockwise direction (as seen in FIG. 1) about knife edge 78 against the force of helical spring 112. The pivotal movement of the contact member 92 causes the same to electrically engage coil 134. It will be appreciated that the pivotal movement of the contact member will cause this engagement with the coil to be progressive, i.e., the contact will initially engage the coil at its left end (FIG. 1) and, as further rotation is undergone, the engagement will increase towards the right direction. The extent of engagement is determined by the extent of movement of push member 46 which in turn is governed by the extent of movement of diaphragm 24. The extent of engagement of contact member 92 with coil 34 determines the resistance offered by sender 10 in the gauge circuit. More particularly, the circuit includes in series the gauge, a voltage source, terminal 142, contact 135, coil 134, and grounded contact member 92. As is evident, the greater the extent of engagement of contact 92 and coil 134, i.e., the closer to the right hand end of coil 134 is the point with which contact 92 comes into engagement, the smaller the resistance offered by the effective length of coil 134.

Referring to FIG. 1, the pressure sender 10 is shown in operation sensing a pressure just slightly above the cut-off pressure, i.e., above the pressure at which the contact member 92 is in electrical disengagement with coil 134 thereby resulting in an open circuit. As seen in FIG. 1, contact member 92 is preferably in electrical engagement with only the last winding 134a of coil 134. It should also be noted that the upper surface of shoulder 52 of push member 46 does not engage spring members 26a, b and, in fact, is space slightly from the lower spring 26a at this pressure. Thus, the only biasing force acting against the movement of contact member 92 and, consequently, push member 46 and diaphragm 24, is that of helical spring 112. The pressure sender is designed so that a sufficient space is provided between shoulder 52 and spring 26a so that the shoulders will not engage spring 26a until a predetermined pressure, e.g., 8 psi gauge is sensed. Thus, in the pressure range below this predetermined value, only the biasing of spring 112 acts against the movement of contact 92. Spring 112 is designed with a relatively low spring constant thereby rendering the sender relatively sensitive in this range, i.e., relatively large movement of contact 92 will occur for pressure changes occurring in this range. The spring 112 is normally compressed to about half its lengths and its compressed length is large in comparison to the normal range of movement of the contact support platform 82 for consistency of the spring constant and spring force from unit to unit irrespective of minor variations in the compressed spring length. Use of a relatively low spring constant in combination with a large free length enhances consistency among units. In the preferred embodiment the spring 112 has a free length of about 1.2 inches and a compressed length of about 0.6 inches. The spring constant is 1.5 pounds per inch. As a result of these parameters, spring force variation is kept to within five percent of the means spring force over a normal adjustment range of 0.0625 inches for the spring 112 during calibration of the sender.

In calibrating the sender, a desired cut-off pressure is closen somewhere within the lower pressure range, e.g., 4 psi gauge. The sender is then coupled to an accurate pressure source which provides the cut-off pressure. At this point, the screw 114 is adjusted by appropriately turning head 118 thereby pivoting the variable resistor assembly 124 until the left-most coil winding 134a (and, preferably, this winding only) is in electrical engagement with contact 92. Thus, the cut-off pressure is accurately set by movement of the resistor assembly itself relative to contact member 92.

The fact that the cut-off pressure lies in the high-sensitivity pressure range, i.e., in the range where only the biasing force of helical spring 112 is operational, provides for an extremely accurate calibration of the device. Accordingly, a slight decrease in pressure below the cut-off pressure will cause a relatively large counterclockwise movement of U-shaped member 92 thereby resulting in an open circuit (and a zero reading on the pressure gauge inserted in the circuit).

Turning to FIG. 2, the pressure sender 10 is shown in operation when subjected to a pressure at the transition between the lower pressure range discussed above and a pressure range including all pressures above this range. This transition pressure is the pressure at which the upper surface of shoulder 52 engages the lower spring 26a. At this point, any further upward movement of diaphragm 24 and, consequently, push member 46, is against the biasing forces of both helical spring 112 and the cantilever spring members 26a, b. Thus, an increase in sensed pressure will result in a smaller movement of contact member 92 about knife edge 78. This has the beneficial effect of increasing the pressure range over which the pressure sender is useful. For example, the sender shown in FIG. 2 may be adapted to attain the configuration shown at a pressure of 8 psi gauge. At this pressure the contact member 92 contacts those coil turns to the left of winding 134b thereby resulting in the coil 134 presenting a lesser resistance (the resistance of the winding to the right of coil winding 134b) in the circuit than it did at the cut-off pressure shown in FIG. 1.

Turning to FIG. 3, the pressure sender is shown in operation sensing a pressure above 8 psig using the example set forth above, e.g. 50 psig. As shown in FIG. 3, the push member 46 has moved upwardly against the biasing forces of both helical spring 112 and cantilever springs 26a, b. The contact member 92 now engages all the windings to the left of a coil winding 134c, thereby causing the resistance offered by coil 134 (the resistance of the windings to the right of winding 134c) to be less than that offered by the coil subjected to the pressures as shown in FIGS. 1 and 2.

The structure of the pressure sender described above results in advantages in addition to the more accurate calibration made possible by the provision of a low pressure range in which the sender is highly sensitive, as discussed above. Whereas prior art devices of this type have been subject to hysteresis problems, i.e., a tendency for the contact member 92 not to return to the same location for the same sensed pressure after cycling to higher (or lower) pressures, due to the relatively low restoring forces available, the present invention does not have this problem. This is due to the pivotal mounting of the contact member about a knife edge rather than the more conventional journal-type bearings usually employed for moveable contact members. The knife edge bearing presents the least resistance to movement of the contact member and thereby does not require the relatively large restoring forces necessary to insure adequate movement of the more conventionally mounted contacts.

Further, the particular structure of the present invention results in the individual units produced during production runs having substantially identical sensitivity throughout their pressure ranges. This is due to the unique provision of having the axes of rotation of both the variable resistor assembly 124 and the contact member 92 being substantially coincident. It can be seen that after each unit is calibrated as discussed above, the angular relationship between the resistor element and the contact member will be the same in each unit produced. If the axes of rotation were not so close as to be substantially coincident, the tolerances inherent in the manufacturing processes would cause such angular relationship to be slightly different in each unit produced. Such difference in angular relationship would result in slightly different sensitivity in each respective unit. By providing the axes of rotation of the resistor element and contact element to be substantially coincident, this problem is avoided in the present invention.

Obviously, numerous modifications and variations of the present invention are possible in light of the above teachings. It is therefore to be understood that within the scope of the appended claims the invention may be practiced otherwise than as specifically described herein.

I claim:

1. A pressure sender adapted to be tapped into a fluid line and to sense the fluid pressure therein comprising:
   a housing;
   means located within said housing for sensing fluid pressure;
   means extending from said housing for providing fluid communication between said pressure sensing means and said fluid line into which said sender is adapted to be tapped;
   resistance means pivotally mounted about an axis of rotation and located within said housing for providing a variable electrical resistance;
   contact means located within said housing adjacent said resistance means and coupled to said pressure sensing means for electrically engaging said resistance means in response to a particular sensed pressure to a predetermined extent so that said resistance means provides a predetermined electrical resistance; and
   means for moving said resistance means relative to said contact means into electrical engagement therewith to a desired extent, said resistance means thereby adapted to provide a desired resistance independently of the pressure being sensed.

2. A pressure sender as recited in claim 1 wherein said moving means includes means for biasing said resistance means about said axis of rotation toward a position out of electrical engagement with said contact means and adjustable stop means for pivoting said resistance means against the action of said biasing means into said desired electrical engagement with said contact means.

3. A pressure sender as recited in claim 1 wherein said resistance means includes a coil having a plurality of windings and said contact means includes a pivotally mounted contact member, said contact member being mounted within said housing for pivotal movement into electrical engagement with a predetermined number of coil windings in response to a predetermined sensed pressure.

4. A pressure sender as recited in claim 3 wherein said resistance means and contact means are pivotally mounted about substantially the same axis of rotation.

5. A pressure sender as recited in claim 1 wherein said resistance means is pivotally mounted and said contact means is pivotally mounted.

6. A pressure sender as recited in claim 5 wherein said pressure sensing means includes a movably mounted push member and said moving means includes means for biasing said resistance means and contact means in opposite rotational directions, said biasing means additionally urging said contact member into continuous engagement with said push member.

7. A pressure sender as recited in claim 6 wherein said biasing means includes a screw having a shank and head, said shank having an end threadedly engaging a wall of said housing and said head bearing against said resistance means prohibiting pivotal movement thereof away from said contact means, and a helical spring captured on said shank having one end biasing said resistance means in a direction away from said contact means.

8. A pressure sender as recited in claim 1 wherein said resistance means is pivotally mounted about a first axis of rotation and said contact means is pivotally mounted about a second axis of rotation parallel and proximate to said first axis of rotation.

9. A pressure sender as recited in claim 8 wherein said first and second axes of rotation are substantially colinear.

10. A pressure sender as recited in claim 1 wherein said moving means includes means for biasing said resistance means toward a position out of electrical engagement with said contact means and adjustable stop means for locating said resistance means against the action of said biasing means into said desired electrical engagement with said contact means.

11. A pressure sender as recited in claim 1 wherein said pressure sensing means includes a movably mounted push member adapted to move in one direction in response to an increase in sensed pressure and further including first biasing means for applying a first, substantially continuous force to said push member in a direction opposite to said one direction and second biasing means for applying a second force to said push member in the same direction as and in addition to said first force only after said sensed pressure exceeds a predetermined minimum pressure.

12. A pressure sender adapted to be tapped into a fluid line and to sense the fluid pressure therein comprising:

a housing;
resistance means located within said housing for providing a variable electrical resistance;
means located within said housing for sensing fluid pressure, said pressure sensing means including a movably mounted push member and means for moving said push member in one direction in response to an increase in sensed pressure;
first biasing means for applying a first substantially continuous force to said push member in a direction opposite to said one direction;
second biasing means for applying a second force to said push member in the same direction as and in addition to said first force only after said sensed pressure exceeds a predetermined minimum pressure; and
contact means engaging said push member for electrically engaging said resistance means to a predetermined extent in response to a particular sensed pressure, said resistance means thereby providing a predetermined electrical resistance.

13. A pressure sender as recited in claim 12 wherein said first biasing means comprises a helical spring.

14. A pressure sender as recited in claim 12 wherein said first biasing means engages said contact means and urges it into engagement with said push member.

15. A pressure sender as recited in claim 12 wherein said resistance and contact means are pivotally mounted, said first biasing means being operatively associated with said resistance and contact means to urge them in opposite rotational directions.

16. A pressure sender as recited in claim 12 further including means for moving said resistance means relative to said contact means into electrical engagement therewith to a desired extent, said resistance means thereby providing a desired resistance.

17. A pressure sender as recited in claim 16 wherein said first biasing means further comprises means for biasing said resistance means toward a position out of electrical engagement with said contact means and adjustable stop means for locating said resistance means against the action of said first biasing means into said desired electrical engagement with said contact means.

18. A pressure sender as recited in claim 12 wherein said second biasing means comprises at least one spring member and wherein said push member includes a spring engagement surface, said push member being mounted with said spring engagement surface being spaced from said spring member when said sensed pressure is below said predetermined minimum pressure and said push member moving means being adapted to move said push member so that said spring engagement surface engages said spring member upon said sensed pressure reaching and exceeding said predetermined minimum pressure.

19. A pressure sender as recited in claim 18 wherein said spring member comprises a leaf spring having at least one cantilevered portion adapted to be engaged by said push member spring engagement portion.

20. A pressure sender as recited in claim 18 wherein said second biasing means comprises upper and lower leaf springs located in abutting relationship to each other and adapted to act in unison.

21. A pressure sender adapted to be tapped into a fluid line and to sense the fluid pressure comprising:
a housing;
a chamber within said housing adapted to be fluid-tight when said sender is tapped into the pressure line partially defined by a diaphragm extending across said housing;

a push member having a rod portion, one end of said push member resting on said diaphragm and being movable therewith, said one end having a spring engaging surface formed thereon;

at least one leaf spring extending across said housing in spaced, substantially parallel relationship to said diaphragm, said spring engaging surface of said push member being normally spaced from said leaf spring and adapted to engage said leaf spring after a predetermined minimum pressure is introduced into said fluid-tight chamber, said leaf spring having an opening centrally formed therein through which said push member rod portion passes;

a mounting wall extending across said housing spaced from said leaf spring, a central opening being formed therein through which said push member rod portion passes;

a mounting member secured to said mounting wall adjacent to said opening therein, said mounting member having a knife edge and being adapted to pivotally flex substantially about said knife edge;

a contact member support platform including a pivot portion having a groove formed therein, said groove pivotally receiving said knife edge, a central portion extending over said opening in said mounting wall and a seating portion having a bore formed therein;

a U-shaped contact member having a pair of contact legs, said contact member being mounted over said platform central portion, adapted to be urged into contact with said push member rod portion;

a resistor assembly including a post portion secured to said mounting member, a body portion having an electrical coil provided therearound, said coil being disposed directly above the space defined between said contact legs, and a bushing portion having a bore formed therein, the axis of said bushing portion bore being substantially aligned with the axis of said platform seating portion bore;

a screw member having a shank portion passing through said bushing portion and platform seating portion bores, said screw member having a head bearing against an upper surface of said bushing portion and a lower threaded portion threadedly engaging a threaded bore formed on said mounting wall; and a helical spring captured on said screw shank portion, the upper end of said spring engaging a lower surface of said bushing portion and the lower end of said spring engaging said platform seating portion.

* * * * *